Nov. 27, 1956      W. A. PFAFF      2,771,816
PORTABLE MICROFILM CAMERA
Filed Aug. 11, 1951      6 Sheets-Sheet 1
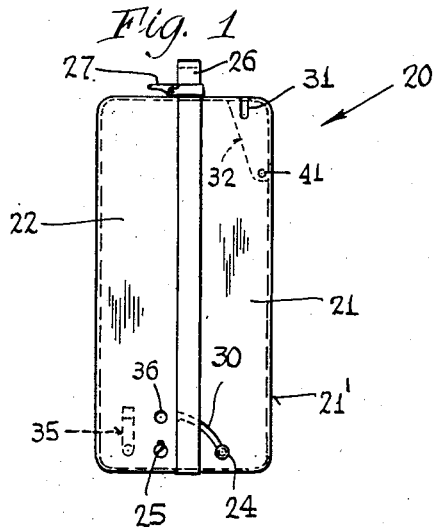
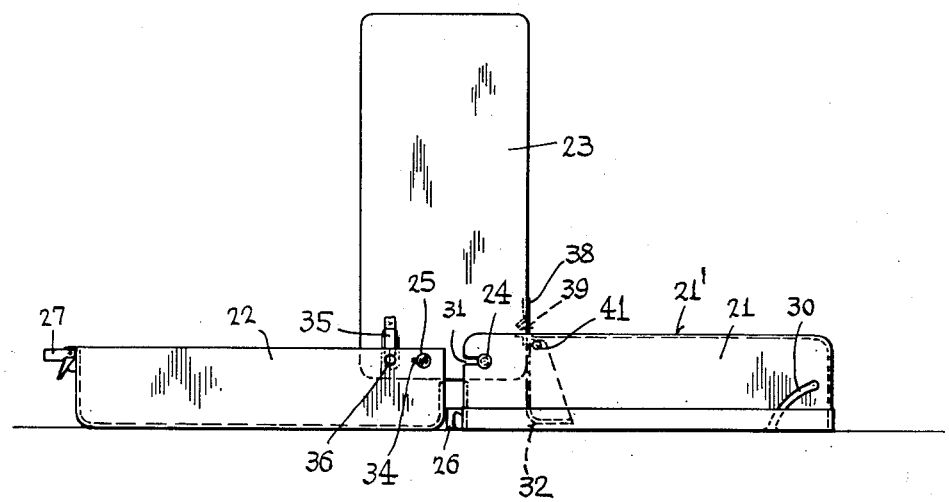
Inventor
William A. Pfaff
By Johnson and Kline
Attorneys Nov. 27, 1956    W. A. PFAFF    2,771,816
PORTABLE MICROFILM CAMERA
Filed Aug. 11, 1951    6 Sheets-Sheet 2

Inventor
William A. Pfaff
By
Johnson and Kline
Attorneys

Nov. 27, 1956 W. A. PFAFF 2,771,816
PORTABLE MICROFILM CAMERA
Filed Aug. 11, 1951 6 Sheets-Sheet 4

Inventor
William A. Pfaff
By Johnson and Kline
Attorneys

Nov. 27, 1956 W. A. PFAFF 2,771,816
PORTABLE MICROFILM CAMERA
Filed Aug. 11, 1951 6 Sheets-Sheet 5

William A. Pfaff Inventor

By Johnson and Kline
Attorneys

Nov. 27, 1956　　　W. A. PFAFF　　　2,771,816
PORTABLE MICROFILM CAMERA
Filed Aug. 11, 1951　　　6 Sheets-Sheet 6
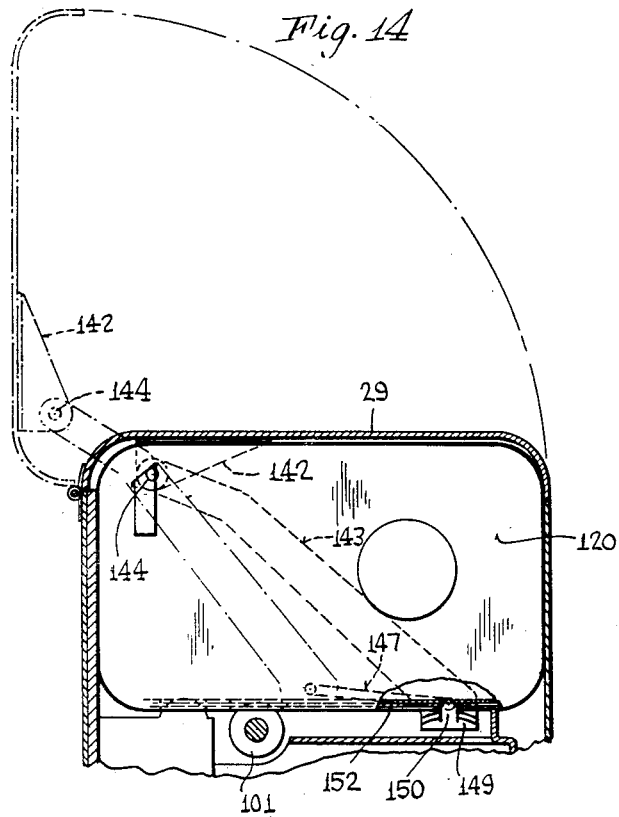
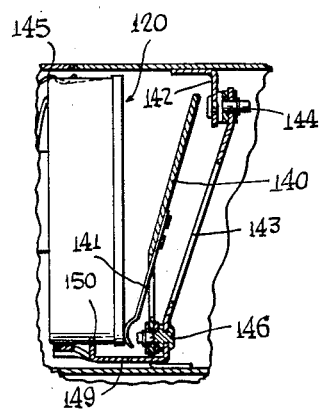
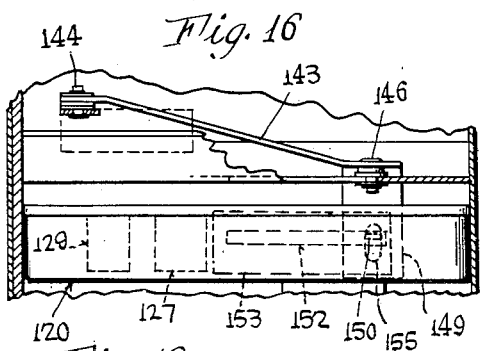
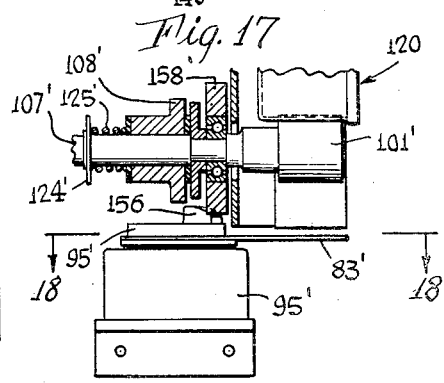
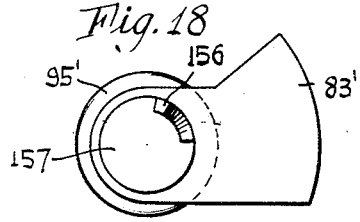
Inventor
William A. Pfaff
By
Johnson and Kline
Attorneys United States Patent Office 2,771,816
Patented Nov. 27, 1956

2,771,816

PORTABLE MICROFILM CAMERA

William A. Pfaff, East Norwalk, Conn., assignor to Diebold Incorporated, Canton, Ohio, a corporation of Ohio Application August 11, 1951, Serial No. 241,418

9 Claims. (Cl. 88—24)

This invention relates to cameras and more particularly to cameras of the flow type in which feed mechanism advances the subject material to be photographed into an illuminated zone, and an optical system forms an image thereof upon a moving light sensitive strip to produce thereon a photographic recording of the subject material. In its more specific aspects this invention is concerned with a microfilm camera of the flow type particularly of small or portable size.

Microfilming cameras and film developing equipment are now extensively used by large corporations and organizations to record important or valuable documents. These machines are rather large and expensive and the volume of work done on them justifies the employment of personnel specially trained in their use and operation.

There are many smaller concerns which have need for microfilmed records of documents and other material but whose volume of work is not sufficient to justify acquiring such expensive apparatus or hiring specially trained persons to operate them. At the present time the only alternative which they have is to send their work to be microfilmed to professionals or to have professionals bring in microfilming equipment to photograph documents after a sufficient quantity has been accumulated to justify the expense.

The present invention seeks to supply the needs of these smaller concerns and organizations by providing a comparatively inexpensive microfilming camera which is so constructed and arranged that it can be operated by ordinary office personnel without special or extensive training and to facilitate the insertion and removal of the photographic strip and the shipping of the exposed strip for processing.

The camera of the present invention is advantageous not only to small concerns but also to larger concerns which for convenience may desire several cameras at different locations about the plant, or in branch offices removed from the main plant or office.

To this end, the camera of the present invention is constructed and organized so that it may be made small and light in weight and the parts are nested and fitted together so as to permit the desired degree of reduction of the original work within the small compass of the camera. The need for expensive and complicated timing mechanism is also obviated. The feed mechanism for the subject material or work is simple and so conveniently arranged that the work enters one side of the camera, is propelled across an illuminated area and projected from the camera at the other side thereof. The light sensitive strip which may be a transparent film is provided in magazine form to be placed in the camera as a unit and has parts cooperating with the parts in the camera so that the strip is fed coordinately with the movement of the work and stops when the work has passed the illuminated zone without requiring any attention on the part of the operator. The feed mechanism draws the strip across the exposure area and keeps it taut during recording. Thus, instead of requiring the skill and dexterity of threading the light sensitive strip through slots and over sprockets as is the case with professional cameras, the user of the camera of the present invention need merely thrust the magazine into the camera to prepare for recording and pull it from the camera when the recording has been completed. The optical system, including the lens, is contained in the camera and has no component parts in or on the magazine. After the strip in the magazine is completely exposed, it may be mailed or otherwise delivered to the manufacturer or other agency to have the strip developed.

The use of a magazine in a microfilm camera has another important advantage in that documents of a class, checks for instance, may be segregated and recorded on the same strip. When these have been photographed, the magazine may be taken from the camera and another magazine inserted in the camera to photograph documents of another class or kind and this may be done sporadically and alternately until each spool is filled, there being no necessity of exposing the entire strip in the magazine before the magazine is removed. To protect the strip while it is out of the camera both before it is exposed and after it is exposed in whole or in part, a suitable shutter arrangement is provided on the magazine to close the aperture through which the strip is exposed.

While it has been stated that the primary purpose of this invention is to provide a lightweight, inexpensive, portable camera, many of the features of the present invention are not limited to a portable camera or in fact to a microfilm camera.

Other features and advantages will hereinafter appear.

In the accompanying drawings:

Figure 1 is a view in elevation showing the portable microfilm camera in its carrying case.

Figure 2 is a view in elevation showing the sections of the carrying case in opened position for operation of the microfilm camera.

Fig. 14 is a fragmentary view in elevation showing a shutter shield and aperture covering mechanism which can be applied to the present invention.

Fig. 15 is a fragmentary view in side elevation, partly in cross-section, showing the shutter shield and aperture covering mechanism.

Fig. 16 is a fragmentary plan view showing the shutter shield and the aperture covering mechanism.

Fig. 17 is a fragmentary view in elevation showing a modification of the rotary solenoid mechanism for operating the lens shutter.

Fig. 18 is a cross-sectional view taken on the line 18—18 of Fig. 17 showing the modified solenoid of Fig. 17 and the modified lens shutter.

Figure 3:
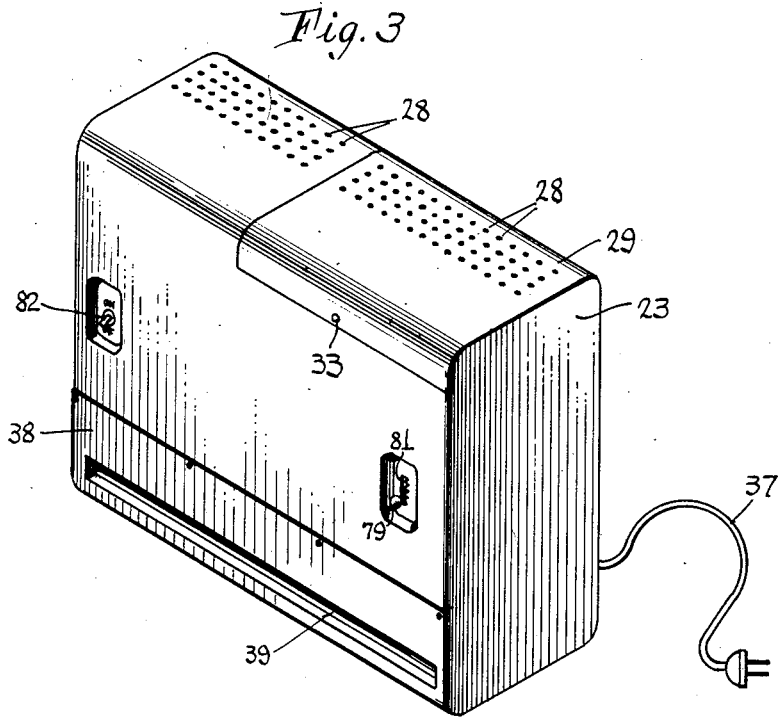
Fig. 3 is a perspective view of the body portion of the portable microfilm camera of the present invention, as it could be used without the carrying case.

In the preferred embodiment of the present invention, as shown in Figs. 1 and 2 of the drawings, the portable microfilm camera comprises a carrying case 20 somewhat generally resembling a portable radio in size and having two covering sections or compartments 21, 22 which are used to enclose the main portion or body 23 of the camera when it is not in use or being carried about. The sections 21, 22 are pivoted to the body 23 of the camera by means of studs or pivot pins 24, 25 which protrude from the lower portion of the body 23, and whereon the casings 21, 22 may be swung outwardly to open positions (somewhat like a piece of luggage) when it is desired to use the camera.

As shown in Fig. 3, ventilating openings 28 are formed in the upper portion of the camera body 23 to provide for free access of air to and from the interior of the camera to prevent over-heating thereof. The upper surface of the camera body 23 is provided with a hinged cover plate 29 closely conforming to the shape of the camera body and which is normally maintained in closed condition by a detent device 33 or similar locking means. This cover plate 29 may be opened upwardly to provide for access into the upper portion of the microfilm camera for purposes of inspection, maintenance, replacement of parts, insertion or removing of magazines, etc.

An electrical connecting cord 37 of any conventional type is provided and connects the microfilm camera to a source of electrical current whereby the electrical elements of the camera may be operated.

Figures 6, 7, 8:
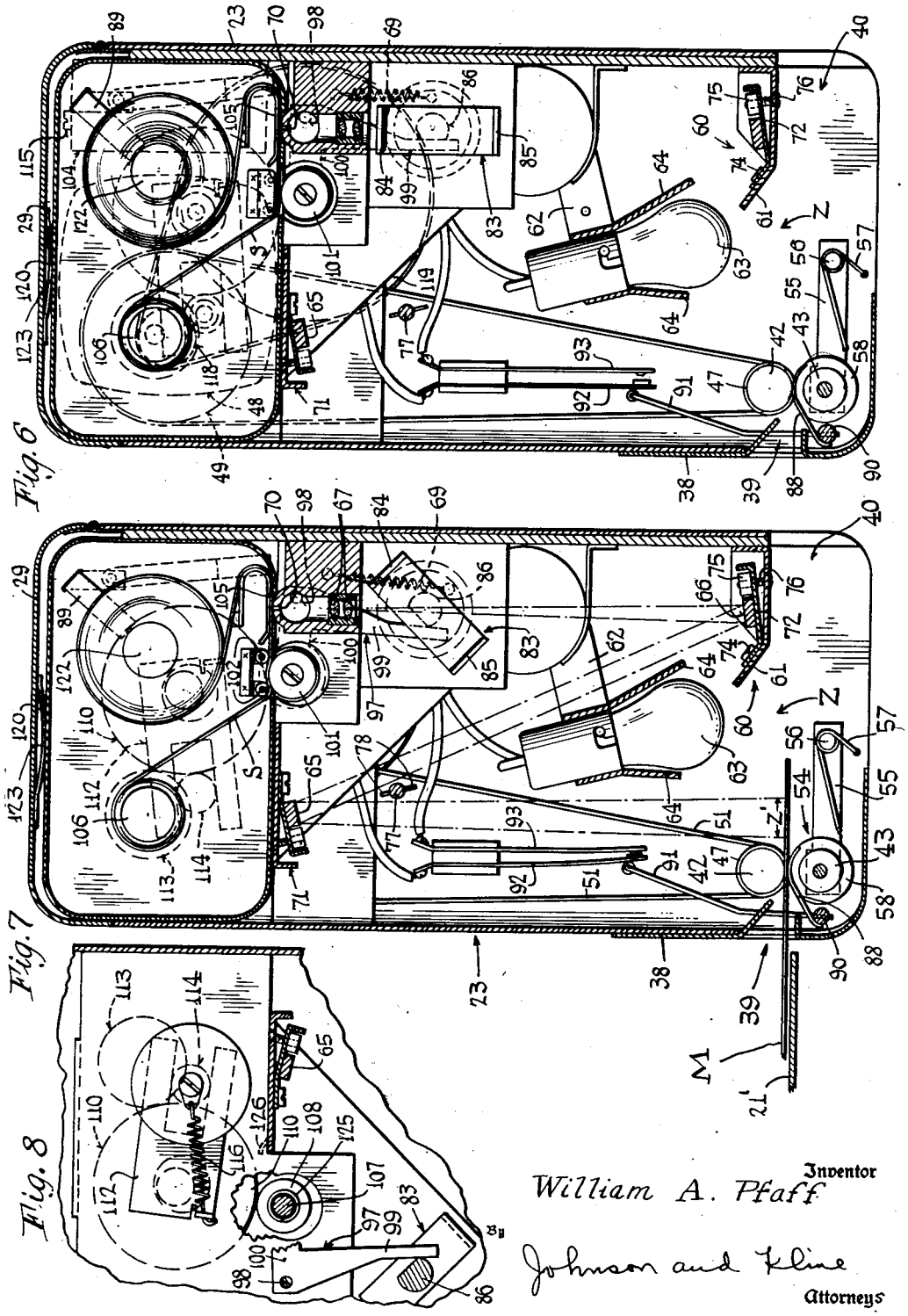
Fig. 6 is a cross-sectional view in side elevation taken on the line 6—6 of Fig. 5.
Fig. 7 is a cross-sectional view taken on the same plane as Fig. 6 but showing the material to be microfilmed passing through the camera and with the shutter in its open position.
Fig. 8 is a fragmentary cross-sectional view taken on the line 8—8 of Fig. 5, showing the driving means for the take-up spool of the film magazine.

In Figs. 3, 6 and 7, the pivot studs 24 and 25 and other related elements have been omitted, for the purposes of clarity and to show that the camera may be used as such without the enclosing sections 21, 22 comprising the carrying case 20. Any objects such as knobs or control levers which may protrude from the camera body may be set within recesses, as desired or required, when the camera body is to be carried within the sections 21 and 22.

A carrying handle or grip 26 is secured to the upper portion of either one or both of the casings 21, 22 and provides a convenient means to carry the camera to wherever it is to be moved and placed in use. Snaps or catches 27 of a conventional type are employed to lock the two sections 21, 22 together in closed condition to prevent accidental opening thereof when not in use or during transit.

An arcuate slot 30 is formed in the lower portion of the casing 21 for cooperation with the pivot pin 24 and the curvature of this slot 30 is such that the casing 21 is incapable of movement on the stud 24 when in closed condition (Fig. 1) but may be swung outwardly and moved clear of the body 23 of the camera by merely releasing the catch 27, when it is desired or necessary to do so. Slots 31 are provided at the other end of the section 21 whereby, after the section 21 has been removed from the body 23, it may be reversed or turned about and re-engaged with the body 23 by entering the studs 24 in the slots 31 in the position shown in Fig. 2, which is the normal operating position of the camera. Suitable catches or detents (not shown) may be used to lock the section 21 in this position so that a firm structure is obtained to hold the camera body 23 in an upright position.

It is to be observed that the flat outer surface 21' of the casing 21 is now facing upwardly and forms a delivery table whereon material to be sent through the microfilm camera may be placed and held in readiness to be microfilmed. Inasmuch as the lower corner of the camera body 23 protrudes within the body portion of the casing 21 in this configuration, a yielding angular flap 32 may be hingedly mounted on the casing 21 as at 41 to form the corner thereof and to be capable of yielding movement when the casing 23 enters that corner space to form the configuration shown in Fig. 2.

When the camera body 23 and the casing 21 are separated, the angular flap 32 will immediately return to its original position as shown in Fig. 1. Catches or snaps could, of course, be used instead of a resilient spring mounting and would merely require some additional manual manipulation in the setting up and re-assembly of the camera.

An elongated opening 34 is formed in the lower portion of the casing 22 for cooperation with the pivot pin 25 whereby the casing 22 may be swung outwardly from the body 23 to the open position shown in Fig. 2. A suitable catch or spring-pressed detent mounted on an arm 35 is arranged on the body 23 and is adapted to cooperate with an opening 36 in the casing 22 whereby it may be locked in the operating open position. It is to be observed that the casing 22 now forms a delivery receptacle or trough shaped compartment to receive any material which has been sent through the microfilm camera.

A slot or entrance 39 is formed in the front wall of the camera body 23 below a facing plate 38 and at the proper height so that material passed along the surface 21' or along any similar table-like structure will naturally enter the slot or entrance opening 39 for movement into and through the camera. As shown in Figs. 6 and 7, the opposite side or rear of the camera body 23 is cut away as at 40 so that any material advanced through the camera will naturally exit therethrough and slide into the delivery receptacle formed by the casing 22, or by any other convenient delivery opening or means positioned thereat.

A pair of positively driven feed rollers 42, 43 are located just within the entrance 39 and are so positioned that any material M inserted into the entrance 39 will enter the bite between the rollers 42, 43 and will be advanced in positive fashion through the body of the microfilm camera. As best shown in Fig. 7, the material M is advanced by the feeding rollers 42, 43 through a zone Z wherein it is momentarily unsupported by any structure before ending its flight in the delivery receptacle formed by casing 22.

Figure 5:
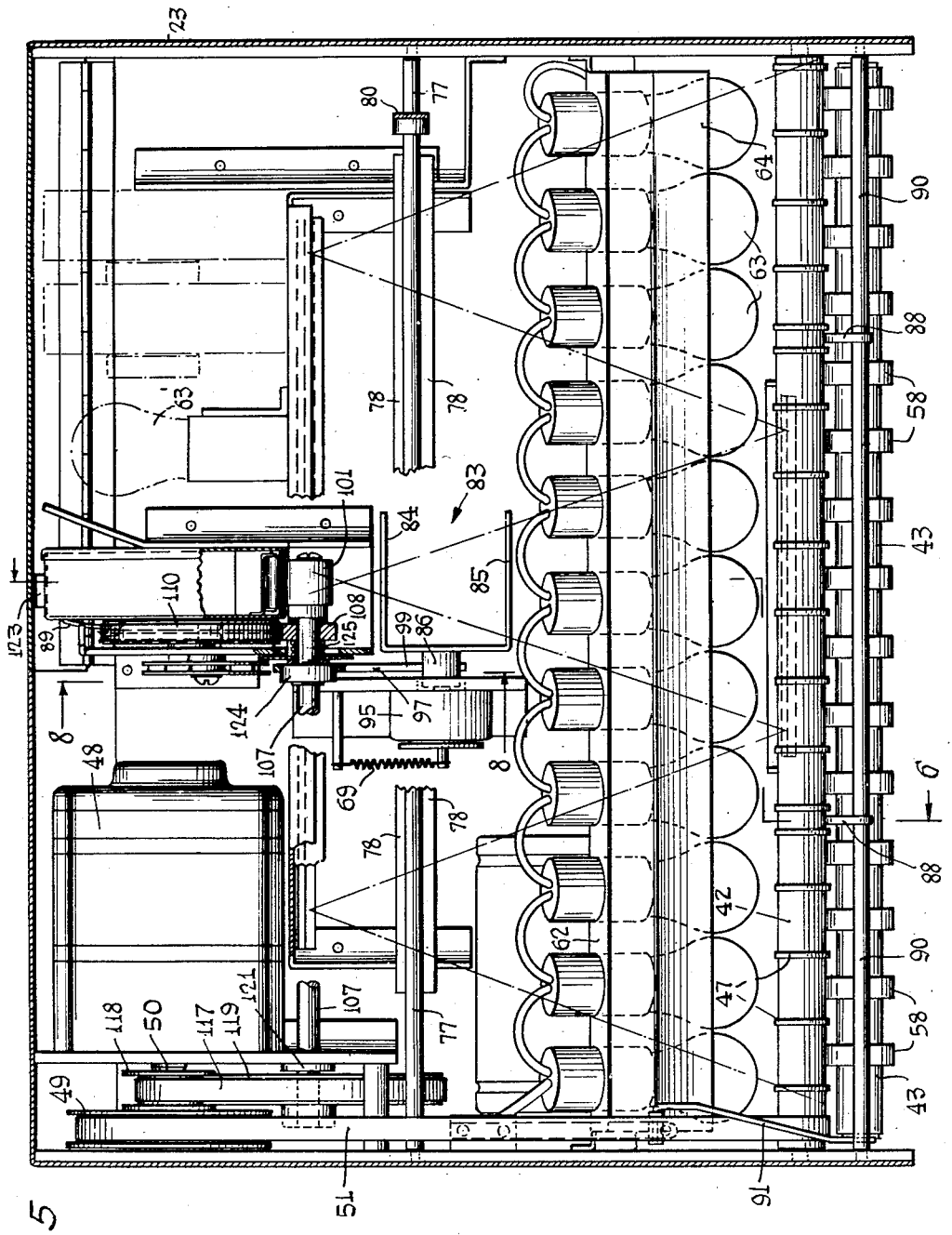
Fig. 5 is a cross-sectional view in elevation of the interior of the camera with the front casing portion of the camera removed.

As shown in Fig. 5, the upper feed roller 42 is generally cylindrically shaped and extends across substantially the full width of the camera body 23 and is received within bearings (not shown) in the end walls thereof. Narrow annular rubber bodies or rings 47 are positioned at intervals along the peripheral surface of the cylindrical feed roller 42 and increase the gripping properties of the roller on any material M passing through the camera. The feed roller 42 is adapted to be driven at a constant speed by a synchronous motor 48 by means of any intervening mechanical linkages. For purposes of illustration, this has been shown as a cooperating pulley 49 mounted on the motor shaft 50 and a V- or power belt 51 which is trained around the pulley 49 and the feed roller 42 whereby it is driven. If desired, any speed reduction mechanism may be used to obtain the required roller rotation.

The lower feed roller 43 similarly is generally cylindrically shaped and extends across substantially the full width of the camera body 23 and is received within arms 55 of floating bearings 54, as shown in Figs. 6 and 7. The arms 55 are pivotally mounted on fixed studs 56 fixed in the camera body and thus provide for pivotal movement of the lower feed rollers 43 toward or away from the upper feed rollers 42. A helical tension spring 57 is coiled around the stud 56 and has one end thereof fixedly secured within an opening in the wall of the camera body and has its other end wrapped under the arm 55, whereby the arm will tend to rotate upwardly in a clockwise direction to press the lower roller 43 resiliently up against the upper roller 42. Annular rubber members 58 are mounted at intervals along the peripheral surface of the lower feed roller 43 for frictional driving contact with the upper feed roller 42.

Consideration of Fig. 5 will also reveal that the outermost peripheral surfaces of the annular rubber members 47, 58 radially overlap each other to some degree whereby any material inserted between the feed rollers will tend to assume a slightly corrugated or undulating configuration which extends longitudinally of the moving copy or subject sheet. Such a corrugated shape will stiffen the material to cause it to extend in a straight line after it has passed through the feed rollers and aids in carrying the material through the zone Z without undue curving or sagging thereof. As a result, merely a single pair of feed rollers is required to propel the material through the camera.

A mounting bracket 60 is secured to the opposite inner surface of the rear wall of the camera body and has an angularly upturned front deflecting undersurface 61 which naturally serves to guide and direct the material M toward the opening at exit 40.

According to the present invention, the motor 48 and feed rollers 42 and 43 operate while the camera is in use. Hence, documents or other material M may be passed at any time into the aperture 39 at one side of the camera and will be immediately gripped by the opposed feed rollers 42, 43, drawn into the camera, propelled through zone Z and discharged from the other side of the camera.

Inasmuch as the material M is to be microfilmed during its passage through the camera, it is necessary that it be subjected to sufficient even illumination in zone Z so that a satisfactory image thereof may be formed and recorded on the microfilm or other light sensitive material. For this purpose, a bank of lamp bulbs 63 mounted on a bracket 62 above the zone Z illuminates the material M passing through that zone. As shown, these bulbs 63 are connected in series and are 12–16 volt 15 cp. such as employed as taillights in vehicles using a 12 volt electrical system. In the particular embodiment shown in Fig. 5, there are eleven bulbs in series which would thus create a voltage drop across each bulb of approximately 10 volts for a standard 110 volt electrical system, whereas the bulb is designed to take 12–16 volts.

One advantage of using such an arrangement is that a greater useful life may be expected of the lamp bulbs inasmuch as a voltage lower than that for which the bulbs were originally designed is being impressed across their terminals. An advantage accruing from the use of a series arrangement is that the failure of any one bulb will cause the entire line to go out which will immediately call the attention of the operator to the fact that a bulb has blown and needs replacement. If the bulbs were in parallel, the failure of any one bulb might not affect the operation of the camera sufficiently to warn the operator with the result that the failure of the bulb could go unnoticed for quite a while during which time the illumination would not be even and may not be sufficent, whereby unsatisfactory microfilming results may be obtained. Spare lamp bulbs 63' may be provided in a bracket in the camera body.

Reflectors 64 may be mounted on each side of the lamp bulbs 63 to direct the light downwardly into the zone Z and also to prevent the escape of stray light into the upper portion of the camera or to parts of the optical system which should be shielded from such undesirable light.

The optical system for forming the image of the material M on a light sensitive strip S is shown in Fig. 7. The image of the particular portion of the material M being recorded at the time lies in portion Z' of zone Z and is reflected upwardly to a light reflecting surface or mirror 65 from which it is reflected downwardly to a second light reflecting surface or mirror 66 from which it is reflected upwardly in zigzag fashion to finally pass through a pair of lenses 67 secured in a light tube or lens mounting carried in the framework of the camera body 23. After passing through the lenses 67, the path of the image passes through a narrow slit or aperture 70 in the mounting carrying the lenses 67 and is then formed and photographically recorded on the strip S.

Adjustability of the light reflecting surfaces 65 and 66 is provided for by mounting them on brackets 71 and 60 secured to the camera body 23. Inasmuch as the adjustment is similar for both brackets, only the adjustment of bracket 60 will be described in detail. A flexible plate 72 is fixed at one end thereof to the bracket 60 by a screw 74 and is adjustably secured at the other end thereof to the bracket 60 by an adjusting screw 76 which fits into a nut 75 secured to the flexible plate 72. Movement of the adjusting screw 76 will cause the flexible plate 72 to assume different angles with respect to the bracket 60 whereby the direction of the folded zigzag path of the projected image of the material may be varied within limits, as desired or necessary.

The dot-dash lines shown in Fig. 7 indicate the field of the lenses 67 of the camera and it will be noted how only the portion of the material M passing through the space Z' will be photographically recorded on the strip S of light sensitive material. The length of the zone Z' as shown in Fig. 7 may, for example, be determined by the width of the narrow strip of mirror 65 in the absence of interfering objects near the mirror.

The present invention provides means of adjustment whereby material having different light reflecting characteristics may be microfilmed to yield consistently satisfactory results. Heretofore, in photography, this was done by varying the shutter opening, increasing or decreasing the time of exposure, changing the illumination, etc. According to the present invention, it has been accomplished by the varying of the time of exposure of the material to the light sensitive strip by varying the effective "length" of the portion Z' of zone Z which represents the time-equivalent of exposure of any given portion of the material M. In other words, the time required for any particular point or portion on the material M to pass completely through the zone Z', which equals the time of exposure of that point or portion to the moving strip S, is controlled.

The increasing or decreasing of the effective light beam emanating from the length of the zone Z' is accomplished by providing a gate positionable adjacent the optical path of the image near the mirror 65. In the form shown, a pivotally mounted rod 77 carries a pair of flanged wing members 78, 78 and a control lever 80 which extends forwardly from the rod and through a notched opening 81 formed in the front surface of the camera body, as shown in Fig. 3. The front portion of the lever 80 is formed with a handle 79 and has a cross-section immediately to its rear to fit within the notches of the opening 81, whereby the lever 80 may be moved to any desired position and held therein by the frictional locking action with the notched opening 81.

Consideration of Fig. 7 will reveal that, when the rod 77 is rotated in a clockwise direction, for example, the lower flange or wing member 78 will move into the right side of the path between the zone Z' and the reflector 65, and cut off one margin portion of the light beam emanating from zone Z'. At the same time, the upper wing member 78 will move into the image path between the reflectors 65 and 66 and cut off the other margin portion.

It will thus be appreciated that the rod 77 and the wing members 78, 78 possess a double action whereby the path of the image is cut down or narrowed simultaneously from both sides. As a result, it is not necessary that the rod 77 be rotated through a very great angle nor that the wing members 78, 78 be of very great width in order to substantially reduce the "length" of the zone Z'. The result is in effect somewhat similar to reducing the width of the mirror 65.

A shutter 83 is provided and is capable of being positioned, as shown in Fig. 6, to effectively intercept the path of the image of the moving material M and prevent its formation on the light sensitive strip S. The shutter 83 is also capable of rotation to a position, such as shown in Fig. 7, wherein it is ineffective as an intercepting means for the path of the image and permits its photographic recording on the light sensitive strip S.

As shown in Fig. 5, the shutter 83 comprises a U-shaped bracket mounted on a rotatable collar or shaft 86 and has an upper arm 84 and a lower arm 85. As shown, the upper arm 84 and the lower arm 85 are straight and formed from rectangular strip stock but such is merely for the purpose of illustration and it is to be understood that other forms could be possible. For example, the arms could be arcuate in cross-section and form arcs of circles with the axis of the rotatable collar 86 forming a center. It is merely necessary that the shutter arms sweep in paths effective to intercept the scope of the optical system and to prevent the projection on the strip S of undesirable light or images.

Consideration of Fig. 5 will reveal that the lower arm 85 is positioned at a greater distance from the axis of the collar 86 than the upper arm 84. This is due to the fact that the path of the projected image is divergent and is wider where it is intercepted by the lower arm 85 than where it is intercepted by the upper arm 84. As a consequence, the lower arm 85 has to sweep through a longer peripheral distance and this is accomplished by making its radius arm to the axis of collar 86 longer than the radius arm of the upper arm 84.

Inasmuch as it is desired to expose the strip S substantially only when material M is in position to be photographed, the shutter 83 is normally in the position shown in Fig. 6, in which it blocks any light which could fall upon the lenses 67. As soon as the material M is placed between the bite of the feed rollers 42 and 43, a pair of curved trip levers or feelers 88 which are mounted on a rotatable shaft 90 located adjacent and parallel to the lower feed roller 43 are depressed thereby to rotate the shaft 90 and to rotate a control arm or lever 91 mounted on the shaft 90. The normal position of the control lever 91 is as shown in Fig. 6, in which its upper portion merely rests lightly and ineffectually against one of a pair of contact members 92, 93.

When the control lever 91 is rotated in a clockwise direction, such as when a moving subject material enters between the bite of the feed rollers 42, 43, the contact members 92, 93 will be pressed into a closed circuit condition, as shown in Fig. 7, and will energize a rotary solenoid 95 which will rotate the collar 86 to turn the upper and lower arms of the shutter to the open position. A return spring 69 is secured to a stud projecting from a plate on the rotary solenoid 95 and is capable of returning the solenoid to its original effective image intercepting position shown in Fig. 6, when the solenoid is de-energized.

Figure 4:
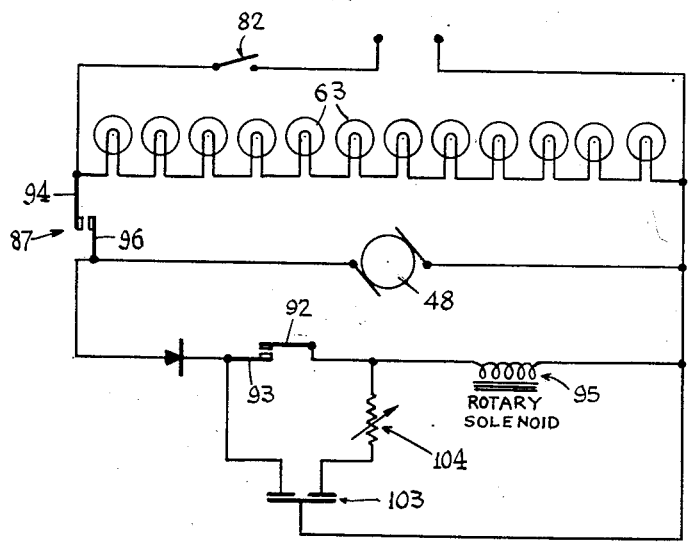
Fig. 4 is an electrical wiring diagram of the portable microfilm camera.
Figure 9:
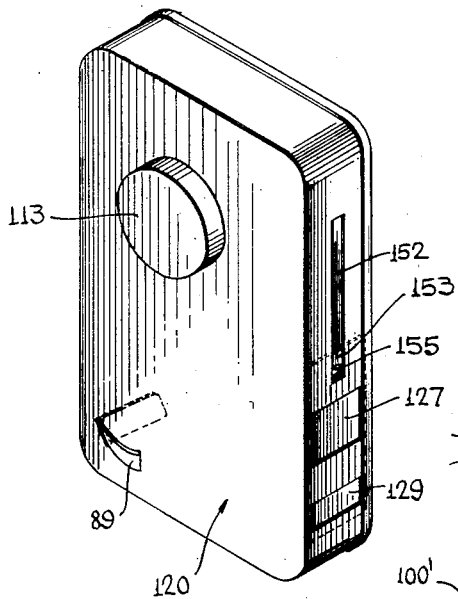
Fig. 9 is a perspective drawing of the removable film magazine of the present invention.
Figure 10:
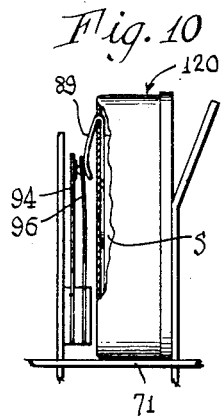
Fig. 10 is a view in end elevation showing the position of the magazine in its operating position in the camera.

The wiring diagram for the contact members 92, 93 and the rotary solenoid 95, is shown in Fig. 4. A line switch 82 is provided and may be a toggle switch mounted on the front face of the camera body for ease of operation by the user of the camera. This switch is closed manually when it is desired to use the camera. A strip magazine switch 87 is provided and merely comprises an arm 89 extending from a strip magazine 120, as shown in Figs. 9 and 10, and is so positioned as to close the contacts 94, 96 of the strip magazine switch only when the magazine is inserted in the camera in its proper position. This arm 89 extends within the strip magazine 120 and rests against the side of the rolled strip S on a delivery or supply spool 122 whereby it is held close to the inner wall of the magazine 120. The external portion of the arm 89 will thus be held well away from the outer surface of the magazine 120 and will keep the contacts 94, 96 in closed condition as long as the outer portion of the arm 89 is urged outwardly by the presence of sufficient rolled strip material on the supply spool 122.

When the supply of strip S is substantially exhausted on the supply spool 122, the inner portion of the arm 89 will yield inwardly whereby the outer portion will also move inwardly to permit the magazine switch 87 to open and to stop the feed rollers 42, 43 and the operation of the camera. This immediately prevents the feeding of additional subject material M into the camera and the operation cannot be resumed until a new magazine replaces the exhausted magazine and the strip magazine switch contacts 94 and 96 are again closed.

When the trip switch contact members 92, 93 are closed, a current flows through the rotary solenoid 95 and the time required to build up sufficient charge to operate the same and to move and rotate the solenoid core (which is an extension of shaft 86) is sufficient to permit the material M to move from its initial position between the bite of the rollers 42, 43 to a point wherein it is entering the space Z' by the time shutter 83 has opened. As the material M continues through the camera, the trip lever 88 remains depressed until the trailing edge of the material permits the trip lever to be raised to open the trip switch contacts 92, 93. When this is done, the current passing through the rotary solenoid 95 falls off but is delayed sufficiently by condenser 103 and rheostat 104 in its circuit, so that the shutter will not be closed by the rotary solenoid 95 until the trailing edge of the material M has cleared the space Z'. Inasmuch as the rheostat 104 is variable, the time of delay for the closing of the shutter may be adjustably selected as desired by the operator by means of an adjusting screw 115 whereby the shutter may remain open momentarily after the material M has passed beyond the space Z' so as to provide a narrow separating space or gap between adjacent recordings on the strip S, which may be varied in width, as desired by the operator, depending on the circumstances of the particular situation.

Thus, it is seen that the movement of the material M is directly synchronized with the opening and closing of the shutter 83 whereby the shutter will be closed whenever there is no material being passed through the camera in position to be microfilmed. Whenever material is being passed through the camera, the shutter will be opened in coordination with the movement of the material M, whereby the path of the projected image of the material M passes through the lenses during the time that the material is in the space Z', that is, in its proper position to be microfilmed.

It is also necessary to synchronize the opening of the shutter 83 in coordinate relationship to the movement of the strip S as well as to the movement of the material M. This is accomplished by the following mechanism. As shown in Figs. 6 to 8, a bell crank lever 97 is pivoted on a stud 98 and has a depending arm 99 in normal pressing contact with the rotatable shaft 86 of the solenoid and shutter mechanism. One portion of the rotatable shaft 86 is flattened so as to cooperate with the depending arm 99. As shown in Fig. 6, the lowermost portion of the depending arm 99 is substantially vertical and a second extending arm 100 of the bell crank lever 97 is substantially horizontal and extends forwardly from the pivot stud 98.

A strip driving roller 101 is mounted on the end of a shaft 107 mounted in bearings in the horizontally extending arm 100 and is normally in such position as to be out of effective driving contact with the strip S. As seen in Fig. 5, the shaft 107 extends to a position immediately adjacent the motor drive shaft 50 and is continuously driven thereby through a power belt 117 which is guided around pulleys 118, 119 mounted on the motor drive shaft 50 and the driving roller shaft 107, respectively. A bearing 121 is provided at the drive pulley end of the driving roller shaft 107 which provides a loose mounting therefor so that the other end of the shaft which carries the driving roller 101 may be raised or lowered by the action of the bell crank lever 97 to frictionally contact or be free of the strip S.

Upon the rotary solenoid 95 becoming energized to rotate the shaft 86, the vertically depending arm 99 contacting the flat portion of the shaft will be rotated on its pivot 98 and will move to the left, as seen in Fig. 7, to cause a rotation of the bell crank 97 in a clockwise direction to raise driving roller 101 into effective frictional driving engagement with the strip S. The driving roller 101 of the camera presses the strip S frictionally against two backing rollers 102 which rotate on shafts fixed within the magazine casing to form the cooperating means for advancing the film strip. This will bring about a firm frictional engagement between the driving roller 101 and the strip S, whereby the strip will be driven. When the solenoid 95 is de-energized, the driving roller 101 will drop away from the strip and its driving engagement therewith will be ended.

The strip S will thus be driven in positive fashion by the driving roller 101 only when the rotatable collar or shaft 86 carrying the shutter 83 is rotated to its operative open position. In this way, the movement of the material M causes the rotary solenoid to become energized which coordinately rotates and opens the shutter and at the same time raises the driving roller to drive the strip S.

The strip driving roller 101 is positioned beyond the slit or aperture 70 through which the projected image of the material M passes and actually draws the film across the aperture from the supply or delivery spool 122. A resilient pad or presser foot 105 is located directly above the strip S over the aperture 70 and resiliently presses and guides the strip thereat.

In order to prevent the formation of slack in the strip S after it has passed the strip driving roller, it is necessary to provide a positively driven take-up spool 106. As shown in Figs. 5 and 8, a second or take-up driving roller 108 is loosely mounted on the same shaft 107 upon which the strip driving roller 101 is mounted. When the driving roller 101 is raised, the take-up driving roller 108 will be simultaneously raised and will contact a large driving wheel 110 which is mounted in resilient sliding fashion upon the frame of the camera body 23 adjacent the magazine.

The operation of the take-up means is best shown in Fig. 8 wherein the take-up driving roller 108 is shown in driving engagement with the large driving wheel 110. The large driving wheel 110 is in direct frictional driving engagement with a take-up wheel 113 which is fixedly mounted on the same shaft upon which the take-up spool 106 within the magazine is mounted, whereby the take-up spool 106 will be driven.

A comparison of the diameters of the strip driving roller 101 and the take-up driving roller 108, as shown in Fig. 5, will show that the take-up roller 108 is slightly larger which will cause it and all subsequently driven rollers to tend to be overdriven and to rotate with greater peripheral speeds than the strip driving roller 101. A slipping clutch arrangement is provided on shaft 107 and comprises a bearing 124 fixed to shaft 107 and rotatable therewith and a pressure spring 125 abutting against the bearing 124 to exert force through a clutching arrangement to bring sufficient resilient pressure to bear on the take-up driving roller 108 so that it is slippingly driven and merely tends to overdrive the take-up roller whereby any tendency to create slack is defeated.

When the vertically depending arm 99 of the bell crank 97 is moved by rotation of the shaft 86, it will raise the take-up driving roller 108 upwardly to contact the large driving wheel 110 to drive the take-up wheel 113 and take-up spool 106 to form take-up cooperating means for the prevention of slack in the film strip.

A projecting arm or lug 126, Fig. 8. is formed out of a portion of the framework of the camera body and is in such a position as to contact the large driving wheel 110 when the shaft 107 is dropped downwardly to drop the take-up driving roller 108. When the large driving wheel 110 drops and contacts the arm 126, a braking action is immediately instituted and any tendency to over-roll is checked. This effectively prevents film from unwinding from the take-up spool. If desired, any other type of brake may be employed to prevent this undesirable tendency to unwind.

The film magazine 120 is manually insertable in and removable from the camera body 23 and is retained in position therein by a spring flex 123 secured to the underside of the hinged plate 29. The magazine is removed by raising the hinged plate 29 and merely lifting out the magazine which naturally rests upon the flanged bracket 71. Inasmuch as a positive driving relationship must be maintained between the take-up wheel 113 mounted on the magazine and the large driving wheel 110 mounted on the frame of the camera body 23, a resilient mounting is provided for the large driving wheel, as shown in Fig. 8. The large driving wheel 110 is mounted upon one end of a bifurcated lever 112, the legs of which are slidably received on a fixed stud 114. A spring 116 is secured to a lug mounted on the fixed stud 114 and is attached to the opposite end of the bifurcated lever 112 and tends to pull the large driving wheel in the direction of the stud 114, so that the normal position of the large driving wheel 110 will be as far to the right as possible, in Fig. 8. When the magazine is inserted downwardly into the camera body, the take-up wheel 113 mounted on the magazine will contact the large driving wheel 110 and urge it downwardly and to the left against the action of the tension spring 116 whereby a strong frictional driving engagement is obtained.

As shown in Fig. 15, an improved manner of inserting the film magazine is shown wherein the magazine 120 may be guided into position by a slide plate 140 which has a spring flex 141 mounted on its lower end. This spring flex 141 urges the lower portion of the magazine 120 to its proper lower left position, as viewed in Fig. 15, and, when the upper portion of the magazine 120 is manually guided to the left, it is held in that position by a spring flex 145 which snaps into a holding recess 148 on the magazine 120 and maintains it in proper position. The removal of the magazine takes place in similar fashion but in reversed manner, of course. The top of the magazine is first moved to the right until it is clear of the snap catch 145 and contacts the guide plate 140. Then, it may be manually removed from the camera body.

The film magazine 120 is illustrated in Fig. 9 and the relative locating of apertures 127 and 129 is to be noted. The aperture 127 provides for the driving mechanism of the camera to contact the strip to drive it, whereas the aperture 129 provides for the projection on the strip of the minified image of the material passing through the camera.

Inasmuch as the apertures must be open during the operation of the camera and must be covered when the magazine case is removed from the camera, an aperture shield 153 must be provided which is capable of movement automatically between an open and a covered position when the case is inserted in or removed from the camera.

As shown in Figs. 14 to 16, the hinged plate cover 29 is provided with depending bracket 142 and pivot stud 144 for freely and rotatably mounting an operating lever 143 thereon. The lower part of the operating lever 143 is provided with a pivotal stud 146, the end of which is received slidably within a guide slot 147 in the framework of the camera. When the hinged cover 29 is raised to its upright open position, as shown in dot-dash outline in Fig. 14, the operating lever 143 will correspondingly be raised and drawn to the left whereby the stud 146 will move from the right-hand end of the slot 147 to the left-hand end thereof. When the hinged cover 29 is lowered to its closed position, as shown in the dotted outline in Fig. 14, the operating lever stud 146 is returned to its lower right-hand end of the slot 147.

An annular arm 149 of the operating lever 143 extends under the magazine case 120 and possesses an upstanding stud 150 capable of penetrating a slot 152 in the bottom of the magazine case which, at this particular location, is double walled. The length of the stud 150 is such as to penetrate only the outer wall of the bottom of the case which leaves the inner wall imperforate and light sealing. The slot 152 is formed in the outer wall of the bottom of the case and the stud 150 is capable of guided sliding motion therein as actuated by the movements of the arm 149 and the operating lever 143.

The shield 153 comprises a strip of flexible material capable of fitting between the walls of the double-walled bottom of the case and sliding therein. A slot 155 is formed in the shield 153 and is so arranged as to lie across the slot 152 of the outer bottom wall of the casing and to be penetrated by the upwardly extending stud 150 of the operating lever 143. It will therefore be appreciated that the to-and-from motion of the operating lever stud 146 in the camera slot 147 and a corresponding movement of the stud 150 in the magazine slot 152 will move the shield 153 to-and-fro from the open aperture position shown in Figs. 14 and 16 when the camera cover plate 29 is down, to a closed aperture position when the camera cover plate 29 is up.

In such a way, the apertures for the lens and the driving roller in the magazine will be automatically uncovered and opened whenever the cover 29 is lowered for operation of the camera and will be automatically covered and closed whenever the cover 29 is raised for removal of the magazine.

Whenever a fresh magazine is to be inserted in the camera, its shield 153 should be in the closed or covered position and the stud 150 will naturally enter the opening 155 of the shield and will be in readiness to uncover the apertures when the hinged cover 29 is lowered.

A more compact mechanism is disclosed in Figs. 17 and 18 for the operation of the shutter movement. A rotary solenoid 95' is used but is so positioned that the plane of rotation of the shutter member 83' is horizontal. It will be readily apparent that energization of the solenoid 95' will cause a rapid rotation of the shutter 83' from the position shown in Fig. 18, wherein it covers the aperture for the camera lens to an open position wherein the lens will be open for the reception of the projection of the image of the material to be microfilmed.

A slightly different arrangement is provided to coordinate the raising of the strip driving roller 101' with the opening of the shutter. Such an arrangement comprises an annular cam 156 which is mounted on a cover portion 157 of the rotary solenoid 95' so as to be rotated in synchronism with the shutter 83'. Movement of the annular cam 156 will cause a cam follower or roller 158 to be correspondingly raised and to urge the strip driving roller 101' into frictional driving contact with the strip S. It is to be noted that the strip driving roller 101' is mounted on the end of a constantly rotating shaft 107' and that a driving roller 108' and a spring pressed clutch 124', 125' are similarly provided to drive the take-up roller in an overdrive relationship in very much the same manner as that set forth in Fig. 8.

Figure 11:
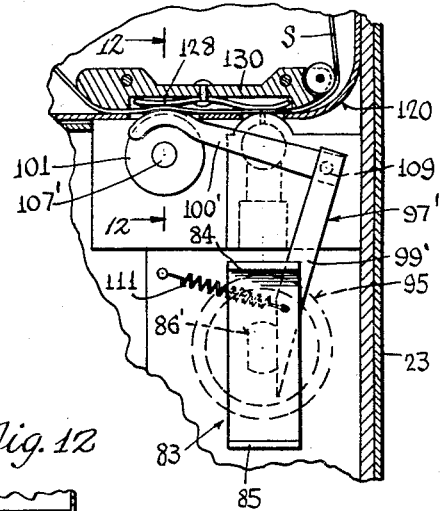
Fig. 11 is a fragmentary view in cross-section showing a modification of the film strip driving means.
Figure 12:
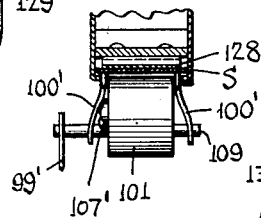
Fig. 12 is a fragmentary view in cross-section taken on the line 12—12 of Fig. 11.

A modification of the mechanism whereby the film strip may be driven intermittently in coordinated relationship with the movement of material into the camera and the rotation of the intercepting shutter is shown in Figs. 11 and 12 wherein solenoid 95 is shown in deenergized position. Upon the energization of solenoid 95 in the usual way by the entrance of material into the camera to be microfilmed, the shaft 86' rotates and causes rotation of a bell crank lever 97' having a vertically depending arm 99' and a pair of horizontally extending arms 100'. The bell crank 97' pivots on a stud or shaft 109 and is urged counterclockwise against the action of a tension spring 111 by the rotation of the shaft 86' which presses against the vertically depending arm 99'.

In this particular type of mechanism, the strip driving roller 101 is mounted on a shaft 107' which is received in relatively unyielding bearings and rotates on a fixed axis. The two arms 100' extend adjacent the strip S and contact its undersurface which is resiliently backed up by a spring flex 128 which normally tends to press the strip S against the strip driving roller 101 in frictional driving engagement therewith. Energization of the solenoid 95 causes the arms 100' to be lowered whereby frictional driving engagement is established and the strip S is advanced past the lens aperture 129.

Upward movement of the arms 100' caused by the deenergization of the solenoid 95 and the action of spring 111, will raise the spring flex 128 to destroy the frictional contact between the strip S and the strip driving roller 101, and the strip will immediately cease its forward motion. A strip guide and roller device 130 is also provided in the magazine 120 to guide the strip close to the apertures 127, 129 in the magazine 120.

Figure 13:
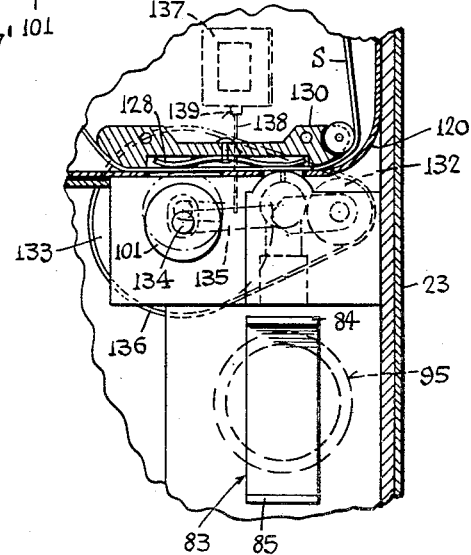
Fig. 13 is a fragmentary view in cross-section showing another modification of the film strip driving means.

Another modification of the mechanism whereby the film strip may be intermittently driven in coordinated relationship with the movement of material into the camera and the rotation of the shutter is shown in Fig. 13. In this modification, the driving power is supplied by a rotatable pulley wheel 132 cooperating with a large driven pulley wheel 133 which is secured on a movable shaft 134 mounted in a pivotally mounted extending arm or swivel 135 and capable of a slight vertical movement. A power belt 136 is trained over the pulley wheel 132 and the large pulley wheel 133 whereby a driving relationship is established. A strip contacting and driving roller 101 is also fixedly mounted on the shaft 134 and is in a position normally clear of the strip S so as to be incapable of driving the same.

A solenoid 137, which is coordinated with the rotary solenoid 95 is arranged above the lever 135 and is secured to it by a connecting rod 138 secured to the core 139 of the solenoid 137. When the solenoid 137 is energized, it will draw the connecting rod 138 upwardly to raise lever 135 and strip driving roller 101 whereby the strip will be driven through the action of the spring flex 128 and the strip driving roller 101.

The solenoids 137 and 95 may be actuated simultaneously or may be operated in sequence in any desired time relationship whereby the opening of the shutter may be coordinated to the moving of the strip and to the entrance of material into the camera.

Other variations and modifications may be made within the scope of the claims and portions of the improvements may be used without others.

I claim:

1. A camera having a casing having entrance and delivery openings through which a subject sheet of a size to be photographed may pass into the casing; means in the casing for illuminating a zone in the path of a sheet moving between said openings; means substantially in alignment with said entrance opening for propelling a subject sheet through the space between said openings and through said illuminated zone, said propelling means consisting of a single pair of cooperating feed shafts and spaced friction rollers carried on each of said shafts, said rollers being located between said entrance opening and the illuminated zone in close proximity to said zone; and means associated with said friction rollers for longitudinally bending the subject sheet as it passes between said rollers to produce corrugations to stiffen the sheet as it emerges from said rollers and cause it to pass through said illuminated zone without substantially drooping.

2. A microfilm camera comprising means to advance material to be microfilmed through an illuminated zone; an optical system to form a minified image of said material on an exposure area; normally inoperative means to move a light sensitive strip through the exposure area into the path of said image; means normally effective to intercept the path of said image; a solenoid connected to actuate said intercepting means; a trip switch operated by the advancement of the material to energize said solenoid to render said intercepting means ineffective; and means including a cam follower connected to actuate the strip moving means and a cam for said follower actuated by said solenoid coordinately to render said strip moving means operative, whereby the strip will be moved when the intercepting means is ineffective and when material is being advanced through the camera in position to be microfilmed.

3. A microfilm camera comprising a pair of driving rollers to advance material to be microfilmed through an illuminated zone; normally inoperative means to move a light sensitive strip through an exposure area; an optical system to form a minified image of the material on the portion of the strip in the exposure area; a shutter mounted on a rotatable support and normally effective to intercept the image; a rotary solenoid operated by the advancement of the material to rotate said shutter and render the same ineffective to intercept the image; a cam mounted on the rotatable support; a cam follower contacting said cam and actuated thereby; and means controlled by said cam follower to coordinately render said strip moving means operative, whereby the strip will be moved when the shutter is ineffective and when material is being advanced through the camera in position to be microfilmed.

4. A portable microfilm camera having a box-like casing one side of which forms a bottom; means comprising a pair of trays having bottoms, side walls and end walls to cover said box-like casing when not in use; means on said box-like casing to mount said covering means thereon; and means to provide for the moving and the repositioning of said trays on said box-like casing, one downturned and one upturned whereby a delivery table and receiving tray are formed therefrom for use with the portable microfilm camera, when in operating position.

5. In combination with a microfilming camera having an illuminated zone, a shutter, a magazine for supplying a light-sensitive strip on which to record an image, an optical system to reflect a minified image on said strip, and means to propel a subject material through said zone; the improvement wherein said camera and magazine have cooperating means for advancing said light-sensitive strip, a normally open magazine switch positioned in said camera adjacent said magazine, switch closing means for closing said magazine switch, said switch closing means being adapted to engage the film in said magazine whereby said switch closing means closes said magazine switch only when said magazine containing an unexposed, light-sensitive strip portion is positioned in said camera, a solenoid for actuating said shutter, a trip switch in series with said magazine switch, said trip switch being operated by the advancement of a subject material to energize said solenoid to operate said shutter, and means actuated by said solenoid coordinately to render said light-sensitive strip cooperating advancing means operative to advance said strip thereby rendering the camera operative only when said magazine contains an unexposed strip portion; and said unexposed strip advancing only when said subject material is being propelled through the camera in position to be microfilmed and the shutter is rendered operative.

6. The invention as defined in claim 5 wherein said strip advancing cooperating means includes a continuously rotating friction driving roller movably mounted in said camera, and a back-up means fixed in said magazine cooperating therewith, said light-sensitive strip being threaded therebetween so that upon actuation of said solenoid said driving roller is moved into cooperating driving relationship with said back-up means to frictionally advance said strip therebetween.

7. The invention as defined in claim 5 wherein said magazine and camera are provided with take-up cooperating means for positively preventing the formation of slack in said strip after it has passed through said cooperating strip-advancing means.

8. The invention as defined in claim 7 wherein said magazine includes a take-up spool in direct driving relation with a take-up wheel mounted on the exterior portion of said magazine, a driving wheel resiliently mounted in said camera adjacent said magazine, said driving wheel adapted to be in driving relationship with said take-up wheel, and normally inoperative continuously rotating roller means movably mounted in said camera, said roller means being adapted to engage said driving wheel to operate said take-up spool when said solenoid is actuated.

9. In combination with a microfilming camera having an illuminated zone, a shutter, a magazine for supplying a light-sensitive strip on which to record an image, an optical system to reflect a minified image on said strip, and means to propel a subject material through said zone, the improvement wherein said camera and magazine have cooperating means for advancing said light-sensitive strip, a magazine switch positioned in said camera adjacent said magazine, switch operating means associated with said magazine for actuating said magazine switch, said switch operating means being adapted to engage the film in said magazine whereby said switch operating means actuates said magazine switch only when said magazine containing an unexposed, light-sensitive strip portion is positioned in said camera, a solenoid for actuating said shutter, a trip switch in a circuit with said magazine switch, said trip switch being operated by the advancement of a subject material to energize said solenoid to operate said shutter, and means actuated by said solenoid coordinately to render said light-sensitive strip, cooperating advancing means operative to advance said strip thereby rendering the camera operative only when said magazine contains an unexposed strip portion, and said unexposed strip advancing only when said subject material is being propelled through the camera in position to be microfilmed and the shutter is rendered operative.

References Cited in the file of this patent

UNITED STATES PATENTS

| 275,606   | Demain    | Apr. 10, 1883  |
|-----------|-----------|----------------|
| 1,010,520 | Pringle   | Dec. 5, 1911   |
| 1,642,818 | Lessler   | Sept. 20, 1927 |
| 1,935,210 | Hopkins   | Nov. 14, 1933  |
| 2,032,633 | Riszdorfer| Mar. 3, 1936   |
| 2,140,445 | Mihalyi   | Dec. 13, 1938  |
| 2,177,135 | Fassel    | Oct. 24, 1939  |
| 2,223,148 | Fullerton | Nov. 26, 1940  |
| 2,292,825 | Dilks     | Aug. 11, 1942  |
| 2,326,654 | Jagust    | Aug. 10, 1943  |
| 2,328,847 | Place     | Sept. 7, 1943  |
| 2,411,694 | Place     | Nov. 26, 1946  |
| 2,419,836 | Holbrook  | Apr. 29, 1947  |
| 2,435,099 | Pratt     | Jan. 27, 1948  |
| 2,455,187 | Owens     | Nov. 30, 1948  |
| 2,466,124 | Owens     | Apr. 5, 1949   |
| 2,466,524 | Williams  | Apr. 5, 1949   |
| 2,472,931 | Yohn      | June 14, 1949  |
| 2,478,641 | Rose      | Aug. 9, 1949   |
| 2,492,127 | Hessert   | Dec. 20, 1949  |
| 2,537,529 | Hessert   | Jan. 9, 1951   |
| 2,565,074 | Halahan   | Aug. 21, 1951  |

FOREIGN PATENTS

| 251,433 | Switzerland | Aug. 2, 1948 |